US007200105B1

(12) United States Patent
Milliken et al.

(10) Patent No.: US 7,200,105 B1
(45) Date of Patent: Apr. 3, 2007

(54) SYSTEMS AND METHODS FOR POINT OF INGRESS TRACEBACK OF A NETWORK ATTACK

(75) Inventors: Walter Clark Milliken, Dover, NH (US); Luis A. Sanchez, Mayaguez, PR (US); Alex C. Snoeren, Cambridge, MA (US)

(73) Assignee: BBN Technologies Corp., Cambridge, MA (US)

( * ) Notice: Subject to any disclaimer, the term of this patent is extended or adjusted under 35 U.S.C. 154(b) by 980 days.

(21) Appl. No.: 10/044,073

(22) Filed: Jan. 11, 2002

Related U.S. Application Data

(60) Provisional application No. 60/261,571, filed on Jan. 12, 2001.

(51) Int. Cl.
*H04L 12/26* (2006.01)
*G06F 11/00* (2006.01)

(52) U.S. Cl. .................................... 370/216; 370/252
(58) Field of Classification Search ........ 714/752–768, 714/776; 711/216
See application file for complete search history.

(56) References Cited

U.S. PATENT DOCUMENTS

| 5,761,531 | A | | 6/1998 | Ohmura et al. |
| 5,765,030 | A | | 6/1998 | Nachenberg et al. |
| 5,802,522 | A | * | 9/1998 | Lloyd et al. ................. 707/101 |
| 5,959,976 | A | | 9/1999 | Kuo |
| 6,038,233 | A | | 3/2000 | Hamamoto et al. |
| 6,134,662 | A | * | 10/2000 | Levy et al. .................... 726/11 |
| 6,138,254 | A | | 10/2000 | Voshell |
| 6,223,172 | B1 | | 4/2001 | Hunter et al. |
| 6,266,337 | B1 | * | 7/2001 | Marco ........................ 370/410 |
| 6,279,113 | B1 | | 8/2001 | Vaidya |
| 6,389,419 | B1 | | 5/2002 | Wong et al. |
| 6,397,259 | B1 | | 5/2002 | Lincke et al. |
| 6,424,650 | B1 | | 7/2002 | Yang et al. |
| 6,430,184 | B1 | * | 8/2002 | Robins et al. .............. 370/392 |
| 6,438,612 | B1 | | 8/2002 | Ylonen et al. |

(Continued)

FOREIGN PATENT DOCUMENTS

WO    WO 0028420    5/2000

OTHER PUBLICATIONS

Todd Herberlein; "Worn Detection and Prevention: Concept, Approach, and Experience"; Net Squared, Inc.;http://www.attackcenter.com/information/WhitePapers/WornDetect/; Aug. 14, 2002; pp. 1-7.

(Continued)

*Primary Examiner*—Hassan Kizou
*Assistant Examiner*—Warner Wong
(74) *Attorney, Agent, or Firm*—Fish & Neave IP Group Ropes & Gray LLP

(57) ABSTRACT

An apparatus (520) for archiving signatures associated with packets received at a node in a network includes a first memory (620), a second memory (625), a signature tap (610), a multiplexer (615), and a controller (630). The signature tap (610) receives packets at the node and computes one or more signatures for each of the received packets. The multiplexer (615) aggregates the computed one or more signatures in the first memory (620) to produce one or more signature vectors. The controller (630) archives the one or more signature vectors in the second memory (625).

32 Claims, 15 Drawing Sheets

U.S. PATENT DOCUMENTS

| | | | |
|---|---|---|---|
| 6,519,264 B1* | 2/2003 | Carr et al. | 370/449 |
| 6,662,230 B1 | 12/2003 | Eichstaedt et al. | |
| 6,707,915 B1 | 3/2004 | Jobst et al. | |
| 6,782,503 B1* | 8/2004 | Dawson | 714/739 |
| 6,804,237 B1* | 10/2004 | Luo et al. | 370/392 |
| 6,842,861 B1 | 1/2005 | Cox et al. | |
| 6,859,433 B1* | 2/2005 | Chen et al. | 370/230 |
| 6,870,849 B1* | 3/2005 | Callon et al. | 370/395.32 |
| 6,909,205 B2* | 6/2005 | Corcoran et al. | 310/12 |
| 6,947,442 B1* | 9/2005 | Sato et al. | 370/447 |
| 6,978,223 B2* | 12/2005 | Milliken | 702/182 |
| 6,981,158 B1* | 12/2005 | Sanchez et al. | 702/188 |
| 6,990,591 B1* | 1/2006 | Pearson | 726/22 |
| 7,043,759 B2* | 5/2006 | Kaashoek et al. | 726/25 |
| 7,062,782 B1* | 6/2006 | Stone et al. | 726/22 |
| 2001/0000821 A1* | 5/2001 | Kolodner et al. | 711/170 |
| 2002/0001384 A1 | 1/2002 | Buer et al. | |
| 2002/0032871 A1* | 3/2002 | Malan et al. | 713/201 |
| 2002/0071438 A1 | 6/2002 | Singh | |
| 2003/0061502 A1 | 3/2003 | Tablyashkin et al. | |
| 2003/0097439 A1* | 5/2003 | Strayer et al. | 709/224 |
| 2003/0110393 A1 | 6/2003 | Brock et al. | |
| 2003/0167402 A1 | 9/2003 | Stolfo et al. | |
| 2003/0233557 A1* | 12/2003 | Zimmerman | 713/186 |
| 2004/0103315 A1* | 5/2004 | Cooper et al. | 713/201 |
| 2005/0014749 A1* | 1/2005 | Chen et al. | 514/227.5 |
| 2005/0057129 A1* | 3/2005 | Jones et al. | 370/389 |
| 2005/0102520 A1* | 5/2005 | Baxter et al. | 713/176 |
| 2005/0213570 A1* | 9/2005 | Stacey et al. | 370/389 |

OTHER PUBLICATIONS

S. Staniford-Chen, and L. Todd Herberlein; "Holding Intuders Accountable on the Internet"; Proceedings of the 1995 IEEE Symposium on Security and Privacy; Oakland, CA, pp. 39-49, May 8-10, 1995.

Stefan Savage, David Wetherall, Anna Karlin and Tom Anderson, Practical Network Support for IP Traceback, Proc. ACM Sigcomm 2000, Stockholm, Sweden, Aug. 2000, 12 pages.

Beverly Schwartz, Alden W. Jackson, W. Timothy Strayer, Wenyi Zhou, R. Dennis Rockwell and Craig Partridge, Smart Packets: Applying Active Networks to Network Management, ACM Trans. On Computer Systems, vol. 18, No. 1, Feb. 2000, pp. 67-88.

Craig Partridge, Luis Sanchez and W. Timothy Strayer, Method and Apparatus for Identifying a Packet, U.S. Appl. No. 00-4039A (U.S. Appl. No. 09/881,145), filed Jun. 14, 2001 (39 Pages).

Luis Sanchez, W. Timothy Strayer, and Craig Partridge, Method and Apparatus for Tracking Packets, U.S. Appl. No. 00-4039B (U.S. Appl. No. 09/881,074) filed Jun. 14, 2001 (34 Pages).

* cited by examiner

SYSTEMS AND METHODS FOR POINT OF INGRESS TRACEBACK OF A NETWORK ATTACK

CROSS REFERENCE TO RELATED APPLICATIONS

The instant application claims priority from provisional application No. 60/261,571, filed Jan. 12, 2001, the disclosure of which is incorporated by reference herein in its entirety.

The instant application is related to co-pending application Ser. No. 09/881,145, entitled "Method and Apparatus for Identifying a Packet" and filed Jun. 14, 2001, and co-pending application Ser. No. 09/881,074, entitled "Method and Apparatus for Tracing Packets" and filed Jun. 14, 2001, the disclosures of which are incorporated by reference herein.

GOVERNMENT CONTRACT

The U.S. Government has a paid-up license in this invention and the right in limited circumstances to require the patent owner to license others on reasonable terms as provided for by the terms of Contract No. N66001-00-C-8038, awarded by the Department of the Navy.

FIELD OF THE INVENTION

The present invention relates generally to communications networks and, more particularly, to systems and methods for tracing back points of ingress of attacks in communications networks.

BACKGROUND OF THE INVENTION

Today's Internet infrastructure is extremely vulnerable to motivated and well-equipped attackers. Tools that may be used in network attacks can be easily obtained through publicly released network vulnerability assessment software or through covert exchanges among "hackers." Well-publicized "hacking" attacks have focused attention on the security weaknesses that exist in many organization's networks. A series of Denial-of-Service (DoS) attacks were recently orchestrated in a distributed fashion against several high profile web sites of companies, such as Yahoo, eBay and Amazon. These attacks relied on the generation of thousands of IP packets from different sources to effectively deny service to a single victim. An effective DoS attack, however, does not necessarily require the generation of thousands of IP packets. It is well known that a single intruder packet can render a host inoperable for hours. For example, a DoS attack using WinNuke can exploit a bug in the Windows TCP/IP stack that relates to TCP packets with the URGENT or out-of-band (OOB) flag set in the packet header. When a machine receives such a packet, it expects a pointer to the position in the packet where URGENT data ends. Windows typically crashes when the URGENT pointer points to the end of the frame and no "normal" data follows. WinNuke, thus, has become the foundation for similar attacks that use a specially crafted packet to crash remote machines.

Accurate and reliable identification of attackers has been, up to this point, nearly impossible because the network routing structure is stateless and based largely on destination addresses. Thus, no records are kept in the routers and the source address is generally not trustworthy since an attacker can generate IP packets masquerading as originating from almost anywhere. Furthermore, if an attacker is able to infiltrate some other facility first, the attack can be launched from that site, making it harder for the target to identify the original source. Generally, attacks currently can be waged from the safety of complete anonymity.

Therefore, there exists a need for systems and methods capable of tracing back packets to their ingress point in a network, regardless of their claimed point of origin.

SUMMARY OF THE INVENTION

Systems and methods consistent with the present invention address this and other needs by providing mechanisms that can archive signatures of packets received at network nodes throughout a network. By comparison matching the archived packet signatures with one or more signatures of an intruder packet, systems and methods consistent with the present invention may determine a path of the intruder packet through the network using known network topology information.

In accordance with the purpose of the invention as embodied and broadly described herein, a method of determining a packet signature in a router includes computing a signature of the router's network address, receiving a packet at the router, zeroing out selected fields in the received packet, and computing a signature of the received packet using the computed signature of the router's network address.

In another implementation consistent with the present invention, a method of archiving signatures associated with packets received at nodes in a network includes receiving packets at a plurality of the nodes in the network; computing first signatures of the network addresses of each of the plurality of nodes; computing one or more second signatures for each of the received packets using the computed first signatures; and archiving the one or more computed second signatures in a memory device.

In a further implementation consistent with the present invention, a method of archiving signatures associated with packets received at nodes in a network includes receiving packets at a plurality of the nodes in the network; computing first signatures of the network addresses of each of the plurality of nodes; computing one or more second signatures for each of the received packets using the computed first signatures; and archiving the one or more computed second signatures in a memory device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms for archiving signatures of packets received at network nodes throughout a network. By comparison matching the archived packet signatures with one or more signatures of an intruder packet detected by an intrusion detection system, systems and methods consistent with the present invention may determine paths of the intruder packet through the network based on a knowledge of the network topology.

Exemplary Network

Figure 1:
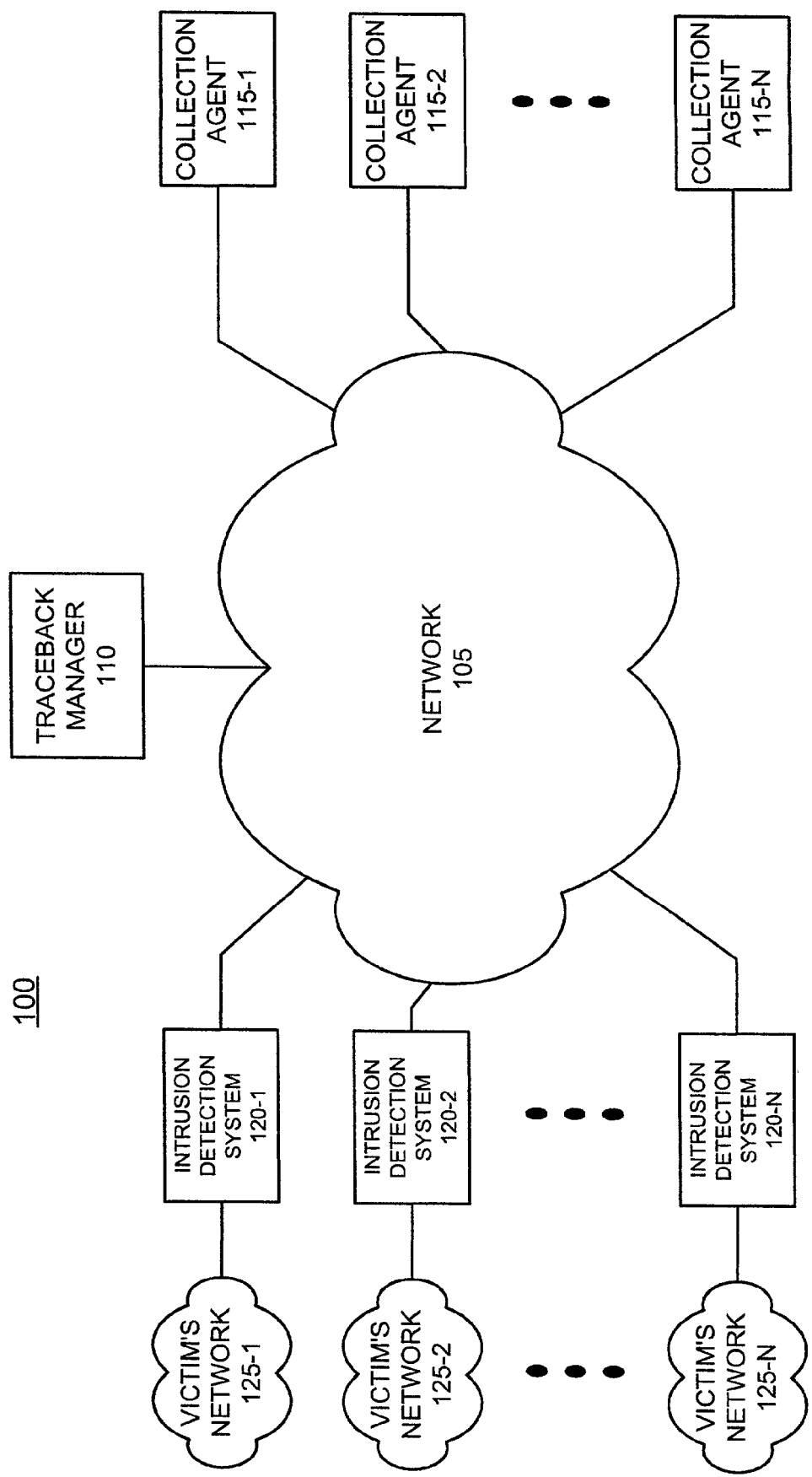
FIG. 1 illustrates an exemplary network in which a system and method, consistent with the present invention, may be implemented.

FIG. 1 illustrates an exemplary network 100 in which systems and methods, consistent with the present invention, may operate to traceback points of ingress of attacks originating within network 100. Network 100 includes traceback manager 110, collection agents 115-1–115-N and intrusion detection systems 120-1–102-N connected with network 105 via wired, wireless or optical connection links (not shown). Network 105 can include one or more networks of any type, including a local area network (LAN), metropolitan area network (MAN), wide area network (WAN), Internet, or Intranet. Attack victim's networks 125-1–125-N may each connect to a respective intrusion detection system 120-1–120-N and may further include a network of any type, including a local area network (LAN), metropolitan area network (MAN), wide area network (WAN), Internet, or Intranet.

Figure 2:
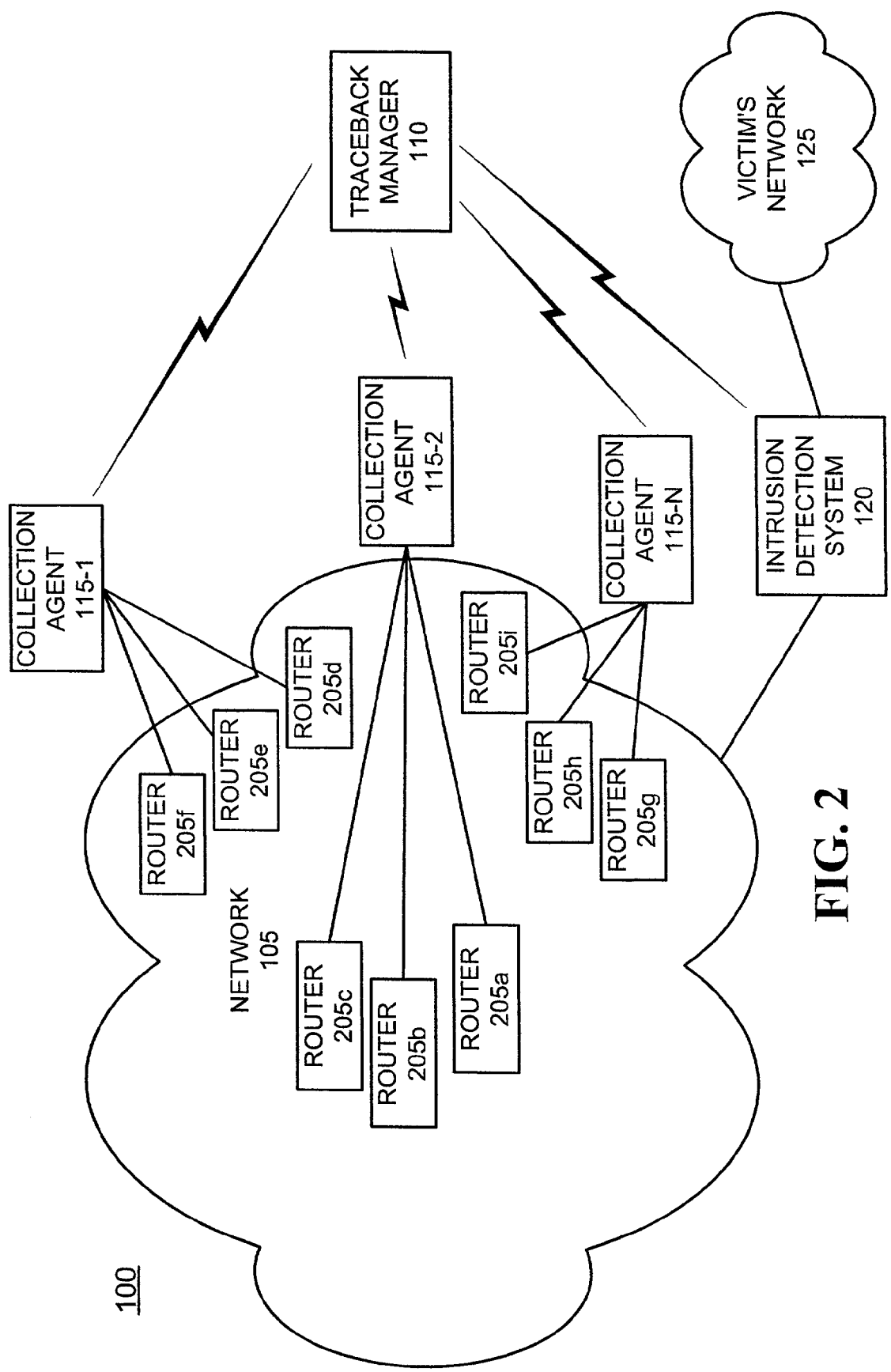
FIG. 2 illustrates further details of the exemplary network of FIG. 1 consistent with the present invention.

FIG. 2 illustrates further exemplary details of network 100. Network 105 may include one or more routers 205a–205i that may route packets throughout at least a portion of network 105. Each router 205a–205i may interconnect with a collection agent 115-1–115-N and may include mechanisms for computing signatures of packets received at each respective router. Collection agents 115-1–115-N may each interconnect with more than one router 205a–205i and may periodically, or upon demand, collect signatures of packets received at each connected router. Collection agents 115-1–115-N and intrusion detection systems 120-1–120-N may each interconnect with traceback manager 110.

Each intrusion detection system 120 may include conventional mechanisms for detecting and reporting attacks upon a victim's network 125. Traceback manager 110 may include functionality for requesting the signatures of packets received at each router connected to a collection agent 115-1–115-N. Traceback manager 110 may request the packet signatures from collection agents 115-1–115-N based on attack reports received from an intrusion detection system 120.

Exemplary Victim's Network Configuration

Figure 3:
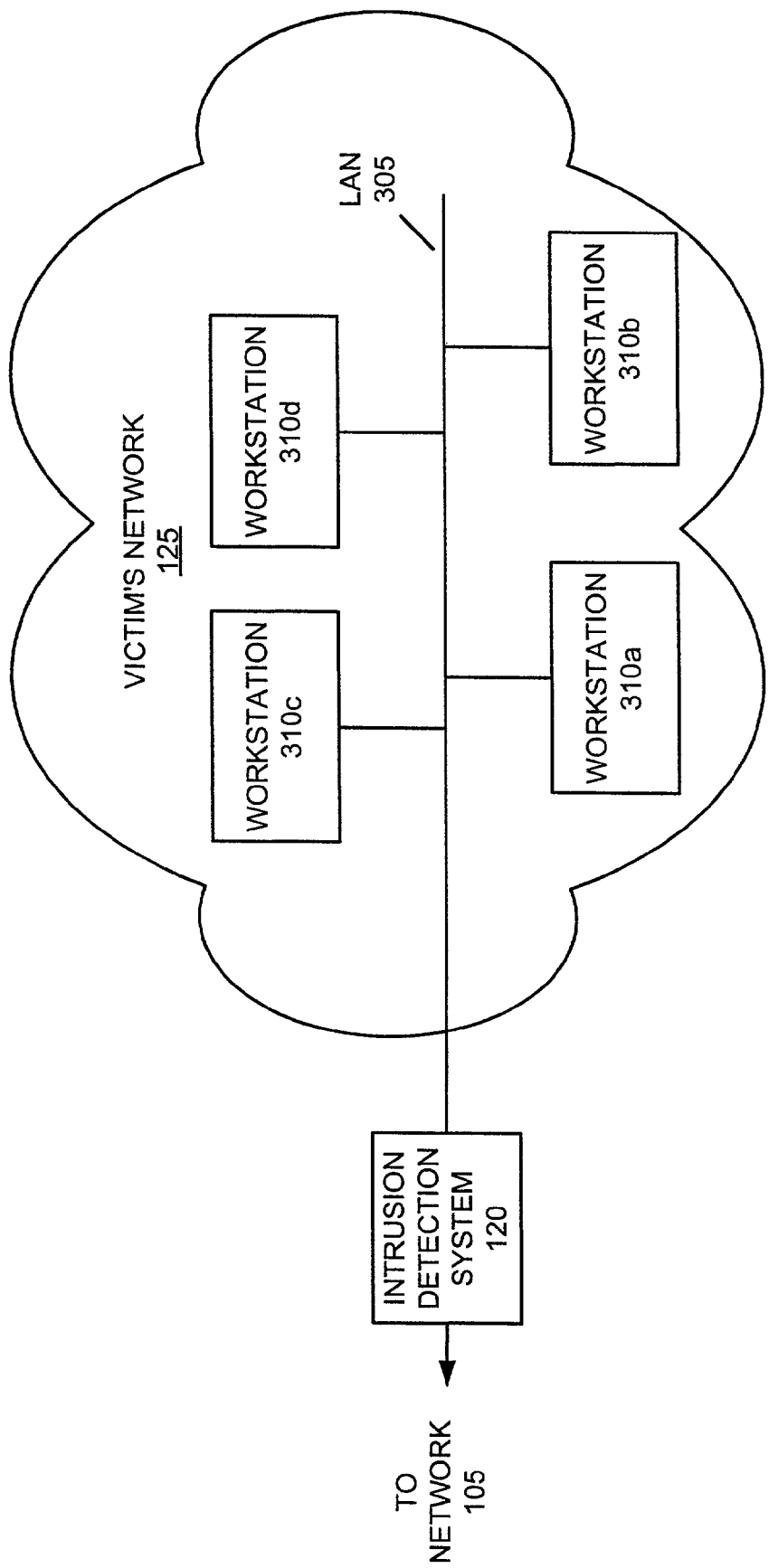
FIG. 3 illustrates an exemplary network victimized by attacks consistent with the present invention.

FIG. 3 illustrates an exemplary configuration of a network 125, consistent with the present invention, victimized by some method of attack detectable by intrusion detection system 120. Network 125 (e.g., 125-1–125-N of FIG. 1) may include an intrusion detection system 120 interconnected with workstations 310a–310d via, for example, a local area network (LAN) 305. Network 125 may include, however, any type of network, such as, for example, a metropolitan area network (MAN), a wide area network (WAN), an Internet, or an Intranet. Intrusion detection system 120 may further interconnect with network 105.

Exemplary Intrusion Detection System

Figure 4:
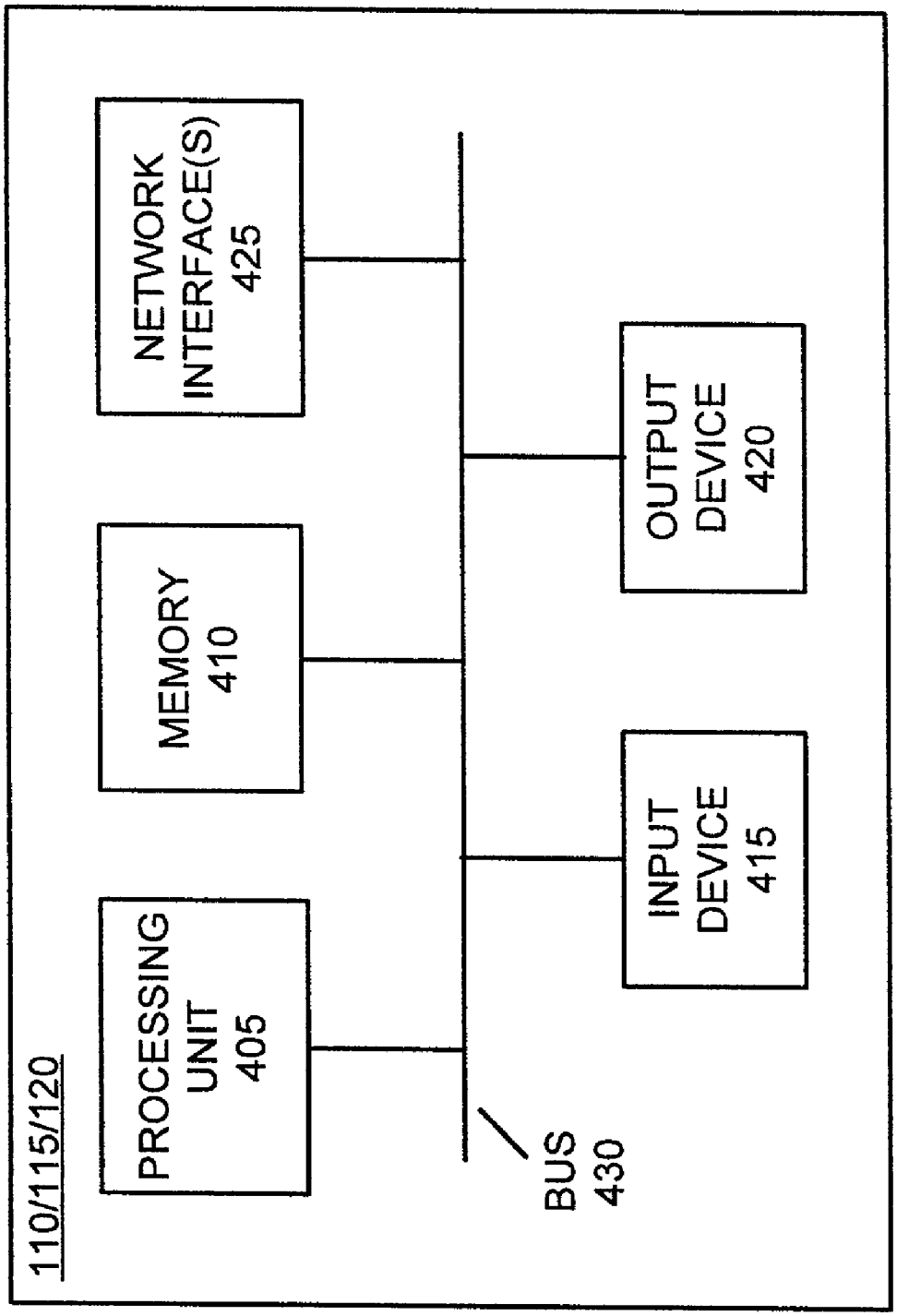
FIG. 4 illustrates exemplary components of a traceback manager, collection agent, or intrusion detection system consistent with the present invention.

FIG. 4 illustrates exemplary components of an intrusion detection system 120 (e.g., 120-1–120-N of FIG. 1) consistent with the present invention. Traceback manager 110 and collection agents 115-1–115-N may also be similarly configured. Intrusion detection system 120 may include a processing unit 405, a memory 410, an input device 415, an output device 420, network interface(s) 425 and a bus 430.

Processing unit 405 may perform all data processing functions for inputting, outputting, and processing of data. Memory 410 may include Random Access Memory (RAM) that provides temporary working storage of data and instructions for use by processing unit 405 in performing processing functions. Memory 410 may additionally include Read Only Memory (ROM) that provides permanent or semi-permanent storage of data and instructions for use by processing unit 405. Memory 410 can also include large-capacity storage devices, such as a magnetic and/or optical recording medium and its corresponding drive.

Input device 415 permits entry of data into intrusion detection system 120 and may include a user interface (not shown). Output device 420 permits the output of data in video, audio, or hard copy format. Network interface(s) 425 interconnect intrusion detection system with LAN 305 and network 105. Bus 430 interconnects the various components of intrusion detection system 120 to permit the components to communicate with one another.

Exemplary Router Configuration

Figure 5:
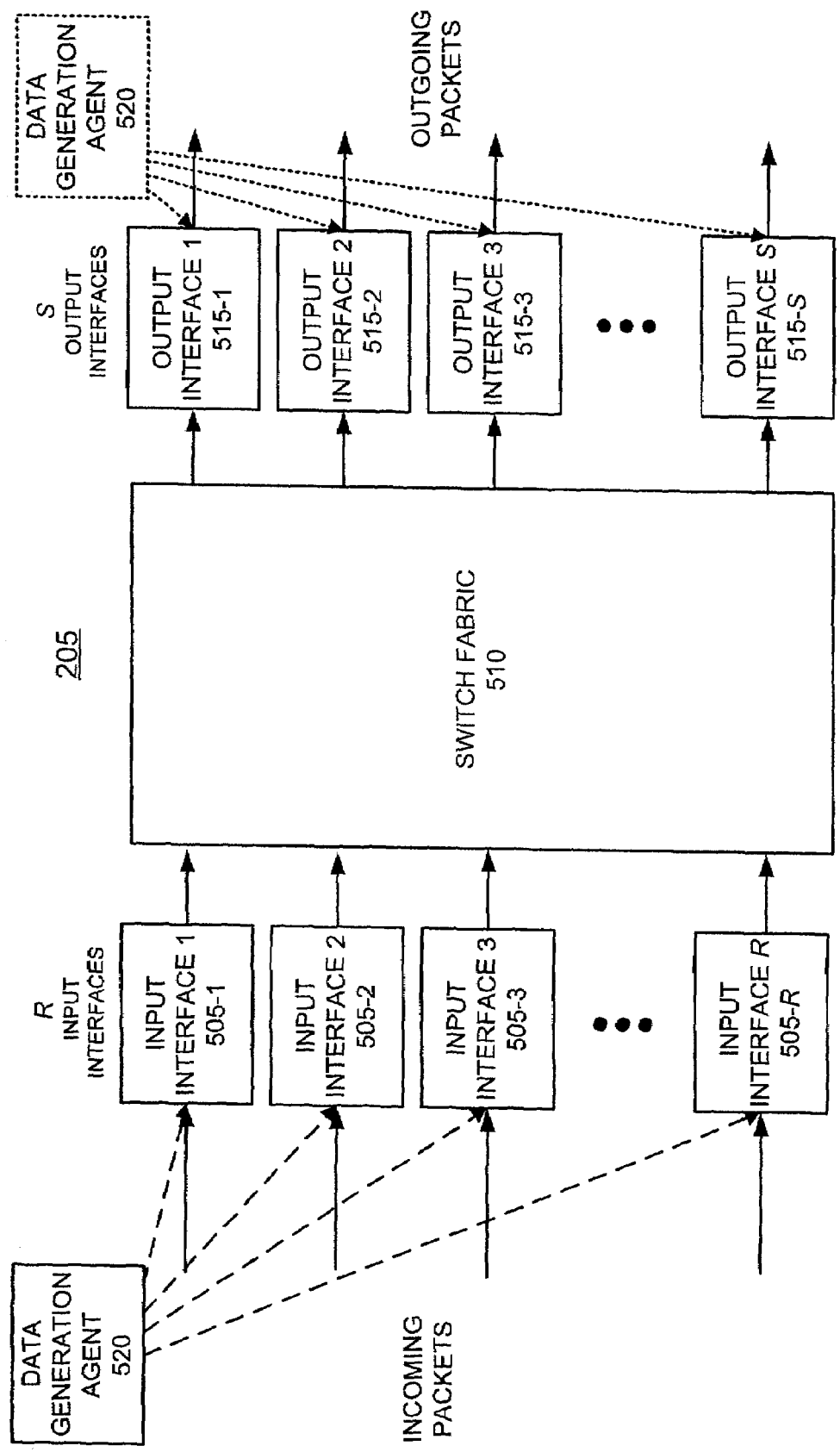
FIG. 5 illustrates exemplary components of a router that includes a data generation agent consistent with the present invention.

FIG. 5 illustrates exemplary components of a router 205 consistent with the present invention. In general, router 205 receives incoming packets, determines the next destination (the next "hop" in network 105) for the packets, and outputs the packets as outbound packets on links that lead to the next destination. In this manner, packets "hop" from router to router in network 105 until reaching their final destination.

As illustrated, router 205 may include multiple input interfaces 505-1 through 505-R, a switch fabric 510, multiple output interfaces 515-1–515-S, and a data generation agent 520. Each input interface 505 of router 205 may further include routing tables and forwarding tables (not shown). Through the routing tables, each input interface 505 may consolidate routing information learned from the routing protocols of the network. From this routing information, the routing protocol process may determine the active route to network destinations, and install these routes in the forwarding tables. Each input interface may consult a respective forwarding table when determining a next destination for incoming packets.

In response to consulting a respective forwarding table, each input interface 505 may either set up switch fabric 510 to deliver a packet to its appropriate output interface 515, or attach information to the packet (e.g., output interface number) to allow switch fabric 510 to deliver the packet to the appropriate output interface 515. Each output interface 515 may queue packets received from switch fabric 510 and transmit the packets on to a "next hop."

Data generation agent 520 may include mechanisms for computing one or more signatures of each packet received at an input interface 505, or output interface 515, and storing each computed signature in a memory (not shown). Data generation agent 520 may use any technique for computing the signatures of each incoming packet. Such techniques may include hashing algorithms (e.g., MD5 message digest algorithm, secure hash algorithm (SHS), RIPEMD-160), message authentication codes (MACs), or Cyclical Redundancy Checking (CRC) algorithms, such as CRC-32.

Data generation agent 520 may be internal or external to router 205. The internal data generation agent 520 may be implemented as an interface card plug-in to a conventional switching background bus (not shown). The external data generation agent 520 may be implemented as a separate auxiliary device connected to the router through an auxiliary interface. The external data generation agent 520 may, thus, act as a passive tap on the router's input or output links.

Exemplary Data Generation Agent

Figure 6:
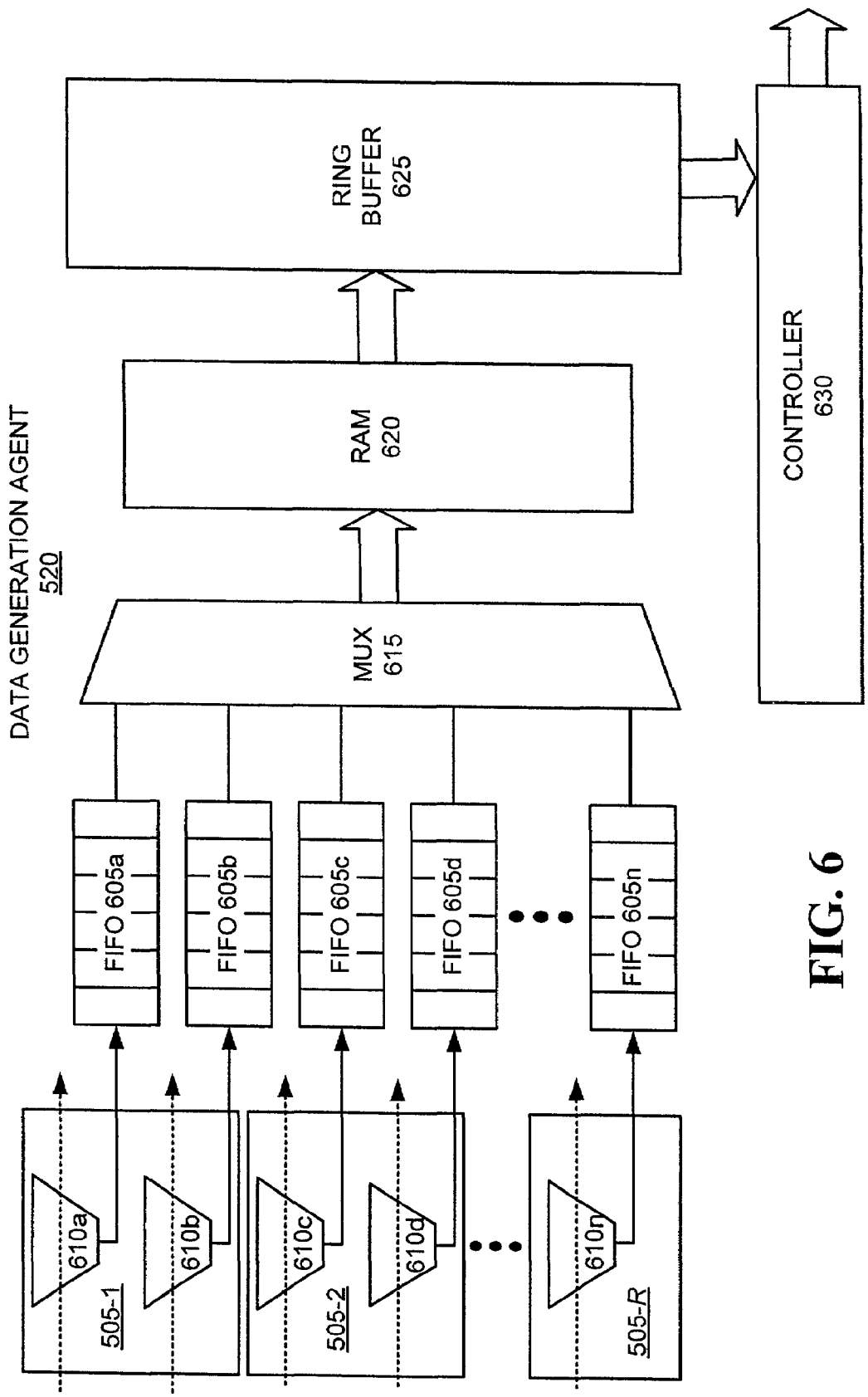
FIG. 6 illustrates exemplary components of a data generation agent consistent with the present invention.

FIG. 6 illustrates exemplary components of data generation agent 520 consistent with the present invention. Data generation agent 520 may include signature taps 610a–610n, first-in-first-out (FIFO) queues 605a–605n, a multiplexer (MUX) 615, a random access memory (RAM) 620, a ring buffer 625, and a controller 630.

Each signature tap 610a–610n may produce one or more signatures of each packet received by a respective input interface 505-1–505-R (or, alternatively, a respective output interface 515-1–515-S). Such signatures typically comprise k bits, where each packet may include a variable number of p bits and k<p. FIFO queues 605a–605n may store packet signatures received from signature taps 610a–610n. MUX 615 may selectively retrieve packet signatures from FIFO queues 605a–605n and use the retrieved packet signatures as addresses for setting bits in RAM 620 corresponding to a signature vector. Each bit in RAM 620 corresponding to an address specified by a retrieved packet signature may be set to a value of 1, thus, compressing the packet signature to a single bit in the signature vector.

RAM 620 collects packet signatures and may output, according to instructions from controller 630, a signature vector corresponding to packet signatures collected during a collection interval R. RAM 620 may be implemented in the present invention to support the scaling of data generation agent 520 to very high speeds. For example, in a high-speed router, the packet arrival rate may exceed 640 Mpkts/s, thus, requiring about 1.28 Gbits of memory to be allocated to signature storage per second. Use of RAM 620 as a signature aggregation stage, therefore, permits scaling of data generation agent 520 to such higher speeds.

Ring buffer 625 may store the aggregated signature vectors from RAM 620 that were received during the last P seconds. During storage, ring buffer 625 may index each signature vector by collection interval R. Controller 630 may include logic for sending control commands to components of data generation agent 520 and for retrieving signature vector(s) from ring buffer 625 and forwarding the retrieved signature vectors to a collection agent 115.

Though the addresses in RAM 620 indicated by packet signatures retrieved from FIFO queues 605a–605n may be random (requiring a very high random access speed in RAM 620), the transfer of packet signatures from RAM 620 to ring buffer 625 can be achieved with a long burst of linearly increasing addresses. Ring buffer 625, therefore, can be slower in access time than RAM 620 as long as it has significant throughput capacity. RAM 620 may, thus, include a small high random access speed device (e.g., a SRAM) that may aggregate the random access addresses (i.e., packet signatures) coming from the signature taps 505 in such a way as to eliminate the need for supporting highly-random access addressing in ring buffer 625. The majority of the signature storage may, therefore, be achieved at ring buffer 625 using cost-effective bulk memory that includes high throughput capability, but has limited random access speed (e.g., DRAM).

Exemplary Data Generation Agent Packet Signature Processing

Figure 7:
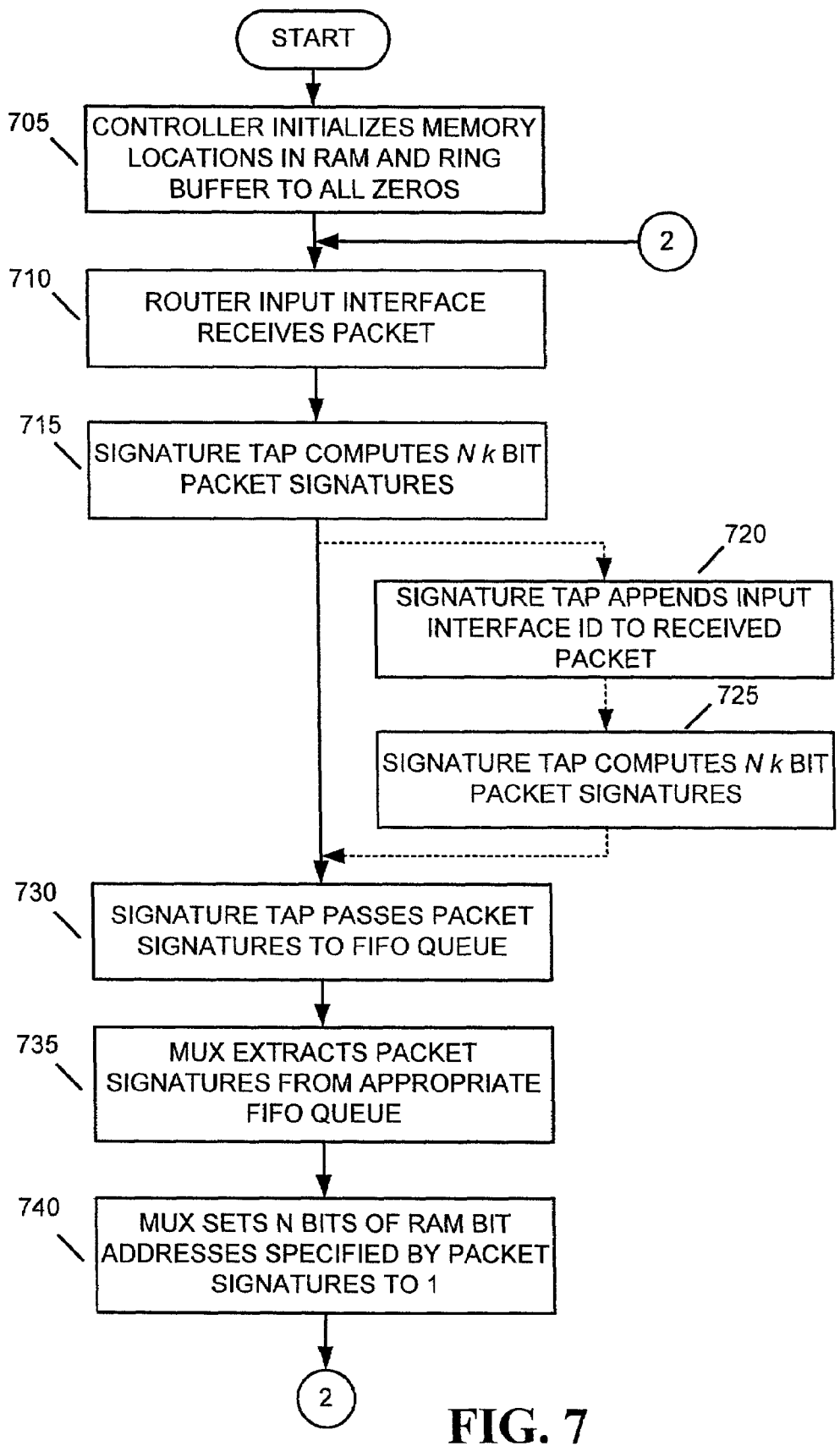
FIGS. 7–14 are flowcharts that illustrate exemplary system processing consistent with the present invention.

FIG. 7 is a flowchart that illustrates an exemplary process, consistent with the present invention, for computation and initial storage of packet signatures at data generation agent 520 of router 205. The process may begin with controller 630 initializing bit memory locations in RAM 620 and ring buffer 625 to all zeros [step 705]. Router 205 may then receive a packet at an input interface 505 or output interface 515 [step 710]. Signature tap 610 may compute k bit packet signatures for the received packet [step 715]. Signature tap 610 may compute the packet signatures using, for example, hashing algorithms, message authentication codes (MACs), or Cyclical Redundancy Checking (CRC) algorithms, such as CRC-32. Signature tap 610 may compute N k-bit packet signatures, with each packet signature possibly being computed with a different hashing algorithm, MAC, or CRC algorithm. Alternatively, signature tap 610 may compute a single packet signature that includes N*k bits, with each k-bit subfield of the packet signature being used as an individual packet signature. Signature tap 610 may compute each of the packet signatures over the packet header and the first several (e.g., 8) bytes of the packet payload, instead of computing the signature over the entire packet. At optional steps 720 and 725, signature tap 610 may append an input interface identifier to the received packet and compute N k-bit packet signatures.

Signature tap 610 may pass each of the computed packet signatures to a FIFO queue 605 [step 730]. MUX 615 may then extract the queued packet signatures from an appropriate FIFO queue 605 [step 735]. MUX 615 may further set bits of the RAM 620 bit addresses specified by each of the extracted packet signatures to 1 [step 740]. Each of the N k-bit packet signatures may, thus, correspond to a bit address in RAM 620 that is set to 1. The N k-bit packet signatures may, therefore, be represented by N bits in RAM 620.

Exemplary Data Generation Agent Packet Signature Aggregation Processing

Figure 8A:
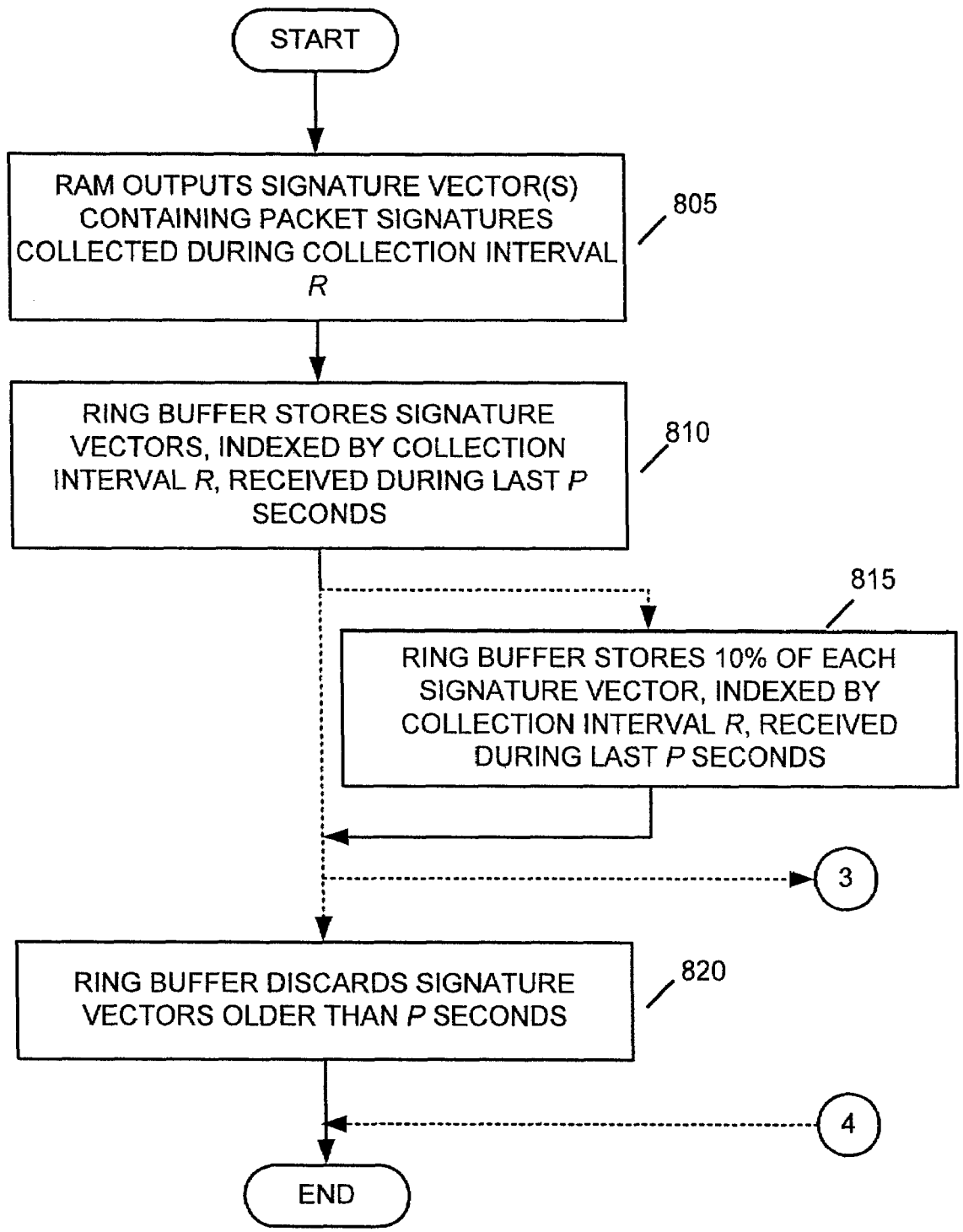
Figure 8B:
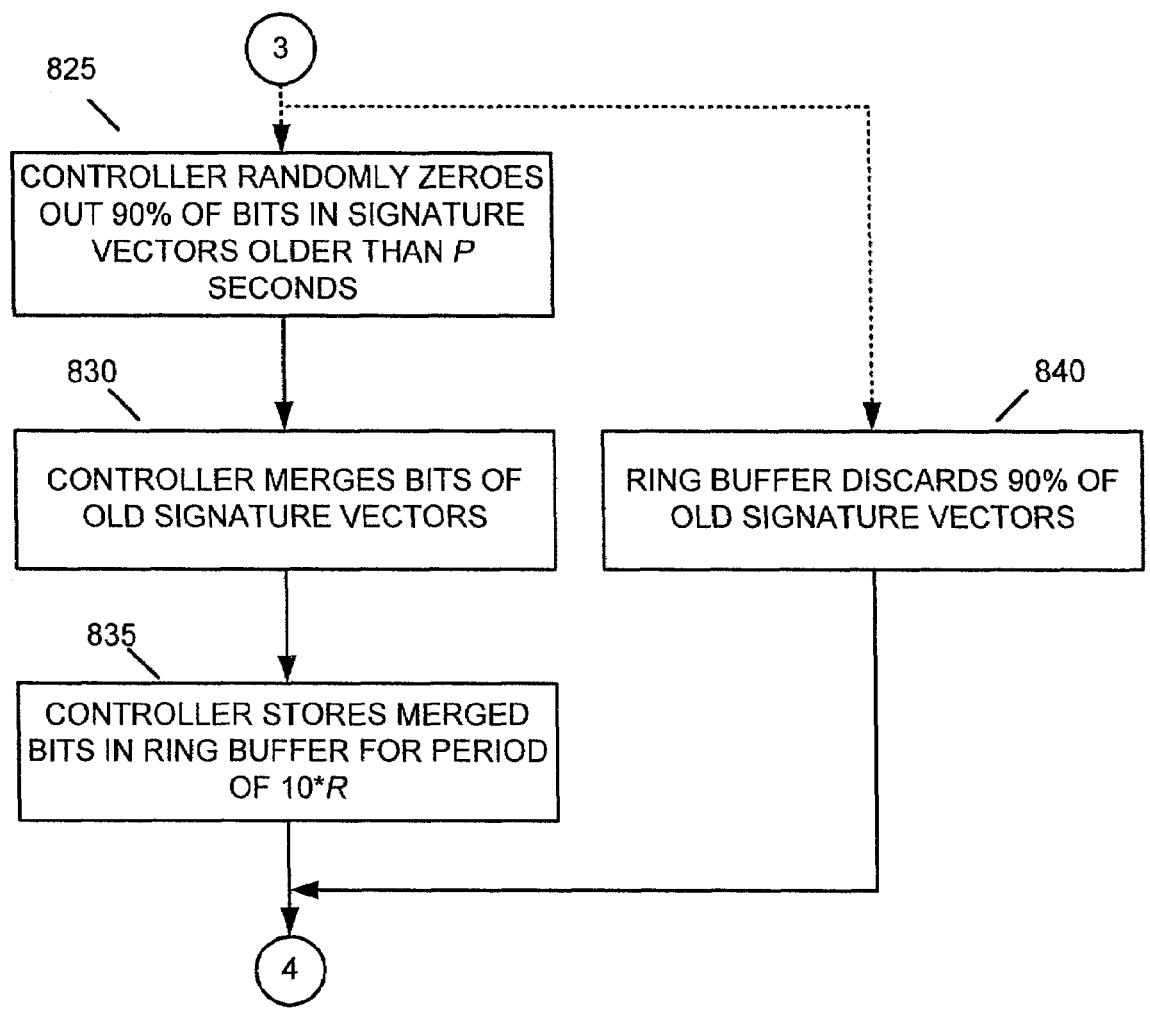

FIGS. 8A–8B are flowcharts that illustrate an exemplary process, consistent with the present invention, for storage of signature vectors in ring buffer 625 of data generation agent 520. At the end of a collection interval R, the process may begin with RAM 620 outputting a signature vector that includes multiple signature bits (e.g., $2^k$) containing packet signatures collected during the collection interval R [step 805]. Ring buffer 625 receives signature vectors output by RAM 620 and stores the signature vectors, indexed by collection interval R, that were received during a last P seconds [step 810]. One skilled in the art will recognize that appropriate values for k, R and P may be selected based on factors, such as available memory size and speed, the size of the signature vectors, and the aggregate packet arrival rate at router 205. Optionally, at step 815, ring buffer 625 may store only some fraction of each signature vector, indexed by the collection interval R, that was received during the last P seconds. For example, ring buffer 625 may store only 10% of each received signature vector.

Ring buffer 625 may further discard stored signature vectors that are older than P seconds [step 820]. Alternatively, at optional step 825 (FIG. 8B), controller 630 may randomly zero out a fraction of bits of signature vectors stored in ring buffer 625 that are older than P seconds. For example, controller 630 may zero out 90% of the bits in stored signature vectors. Controller 630 may then merge the bits of the old signature vectors [step 830] and store the merged bits in ring buffer 625 for a period of 10*R [step 835]. Furthermore, at optional step 840, ring buffer 625 may discard some fraction of old signature vectors, but may then store the remainder. For example, ring buffer 625 may discard 90% of old signature vectors.

Exemplary Data Generation Agent Signature Forwarding Processing

Figure 9:
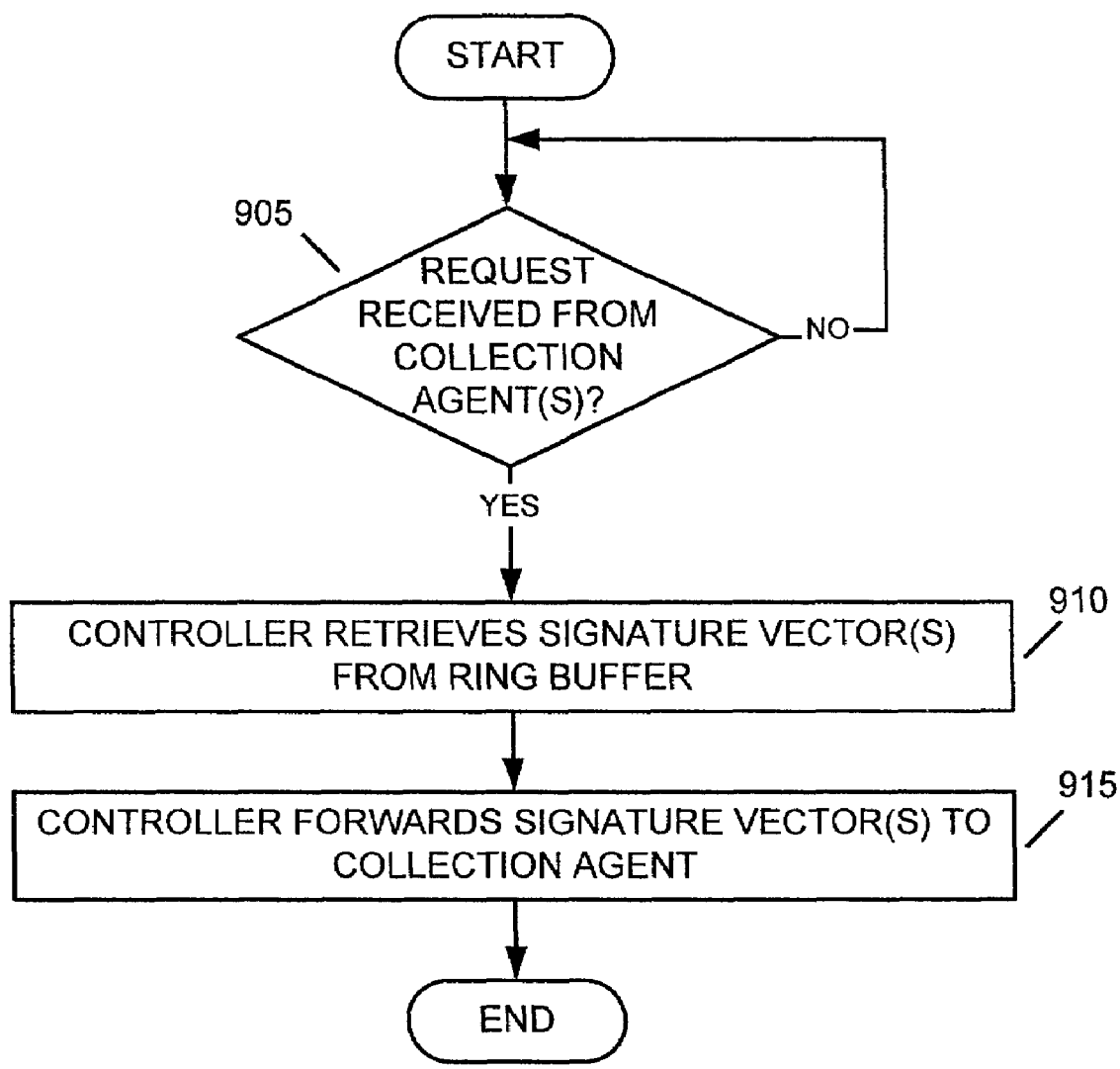

FIG. 9 is a flowchart that illustrates an exemplary process, consistent with the present invention, for forwarding signature vectors from a data generation agent 520, responsive to requests received from a data collection agent 115. The process may begin with controller 630 determining whether a signature vector request has been received from a collection agent 115-1–115-N [step 905]. If no request has been received, the process may return to step 905. If a request has been received from a collection agent 115, controller 630 retrieves signature vector(s) from ring buffer 625 [step 910]. Controller 630 may, for example, retrieve multiple signature vectors that were stored around an estimated time of arrival of the intruder packet in network 105. Controller 630 may then forward the retrieved signature vector(s) to the requesting collection agent [step 915].

Exemplary Packet Signature Processing

Figure 10:
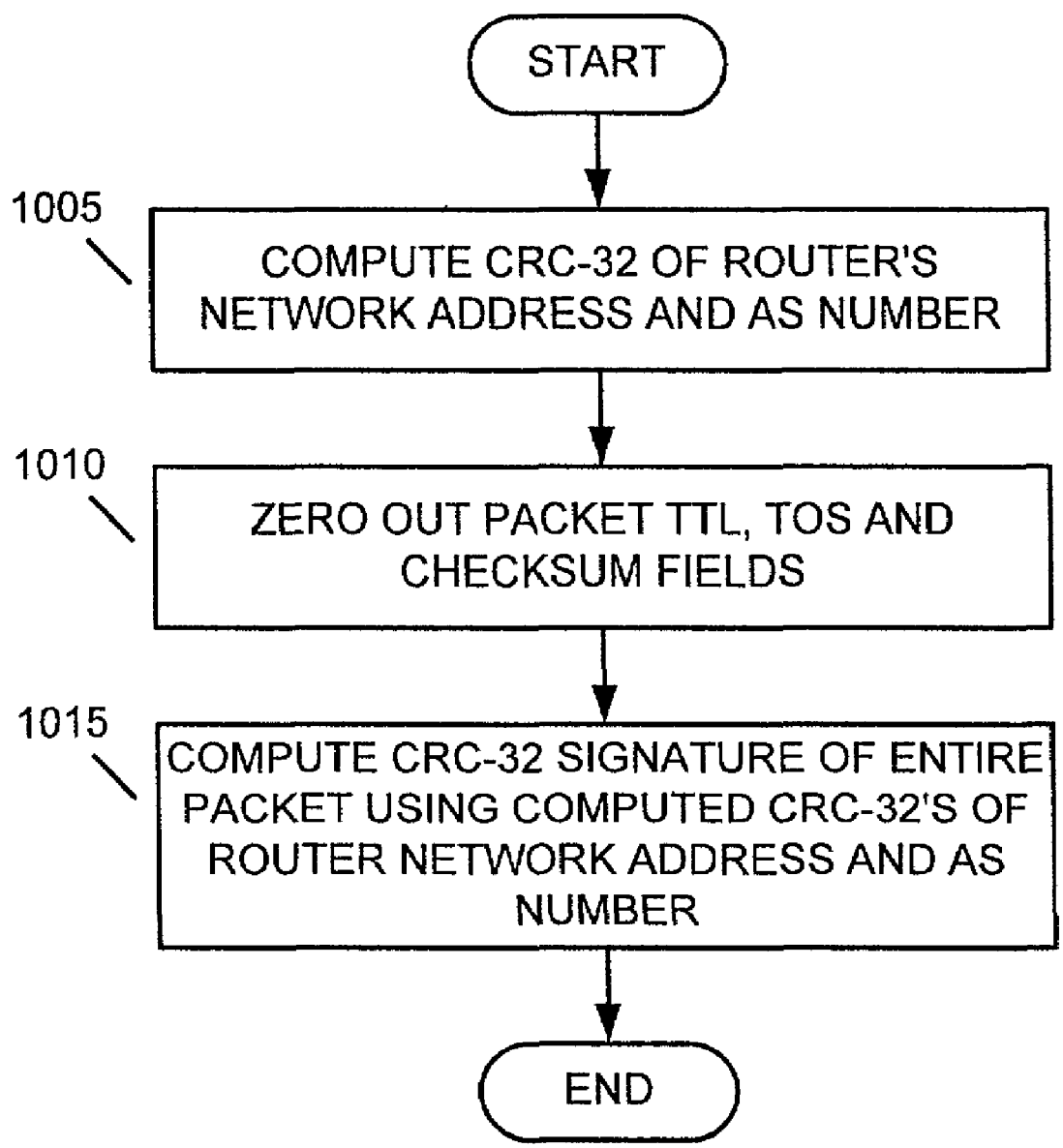
Figure 11:
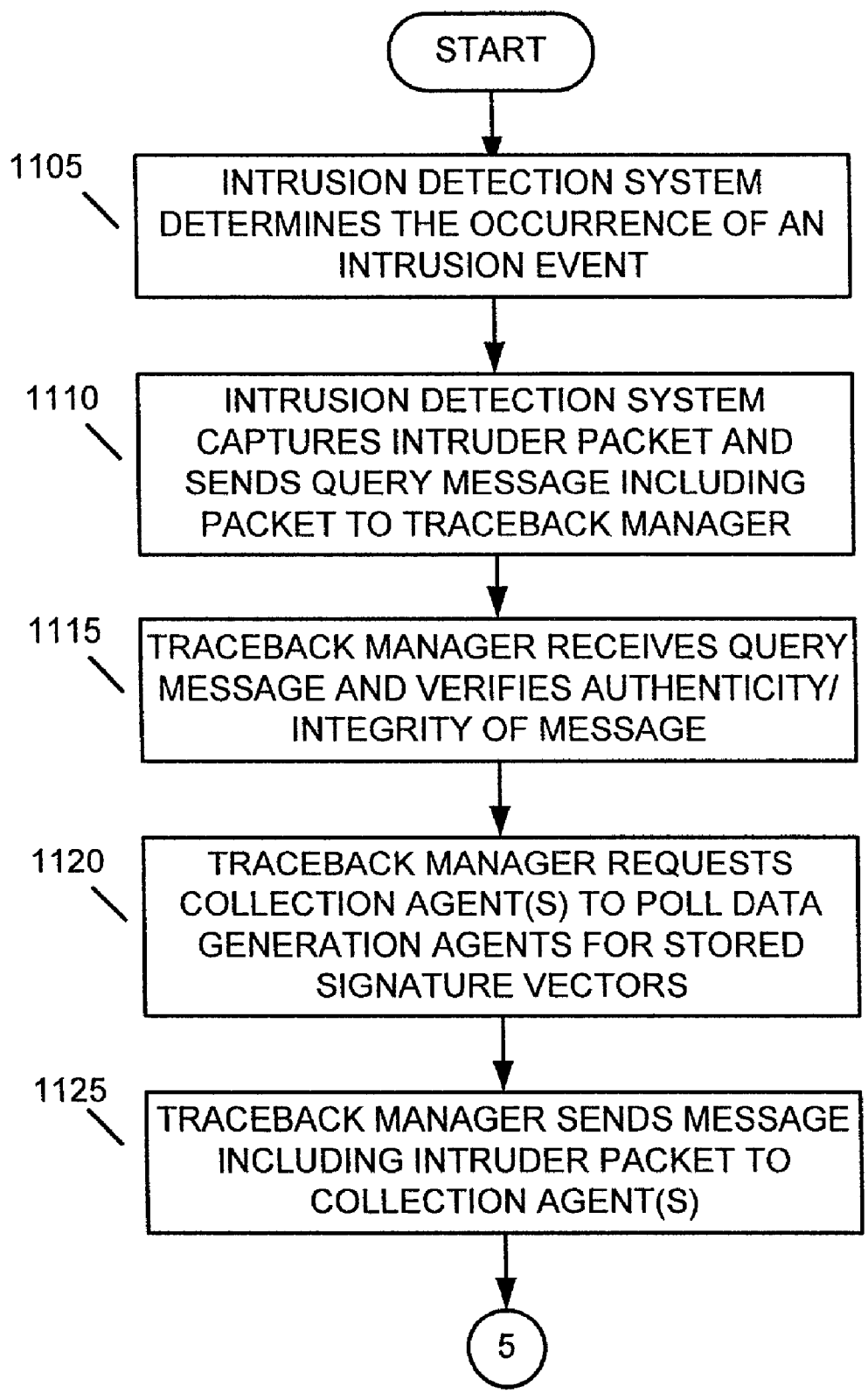
Figure 12:
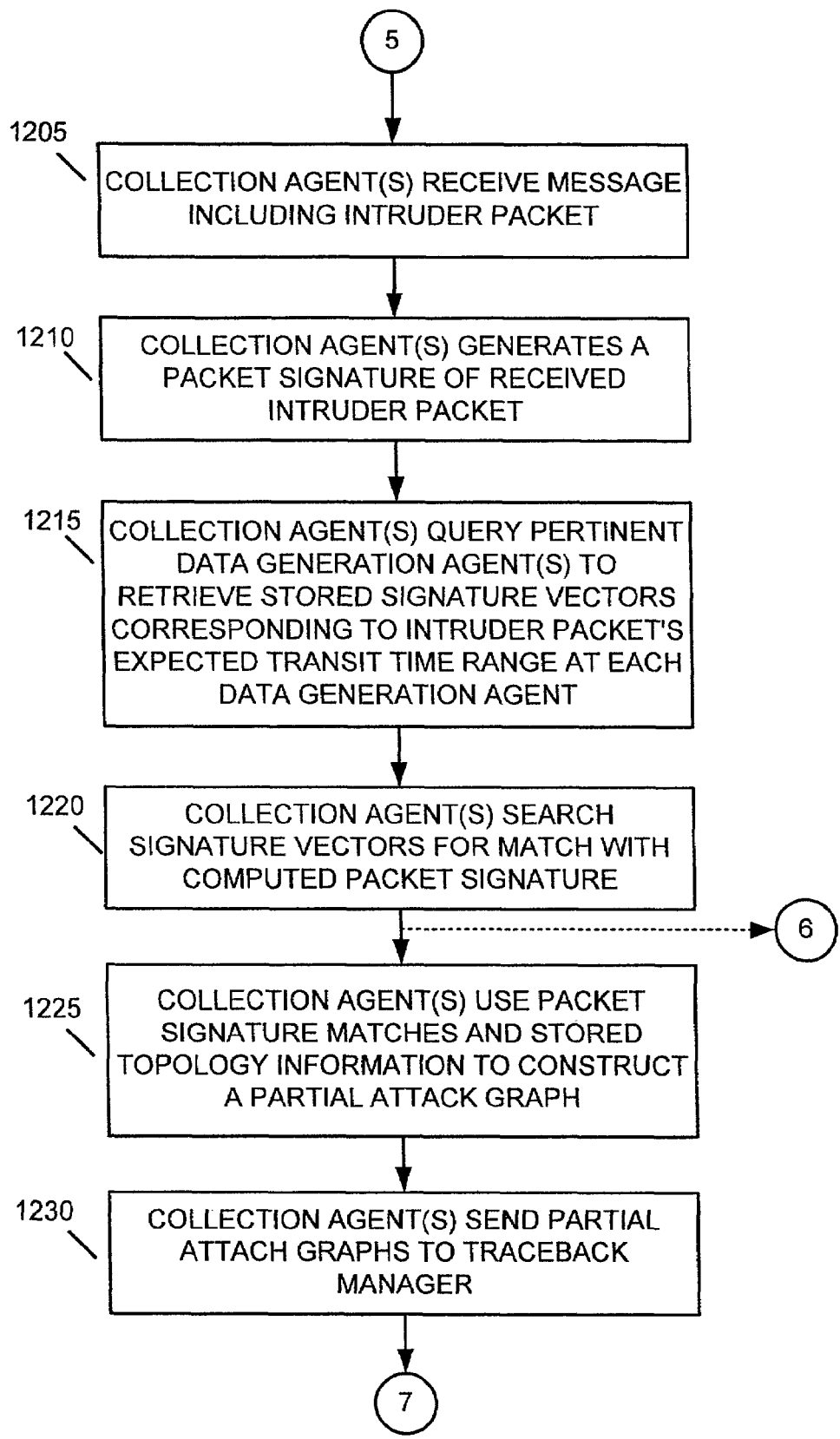
Figure 13:
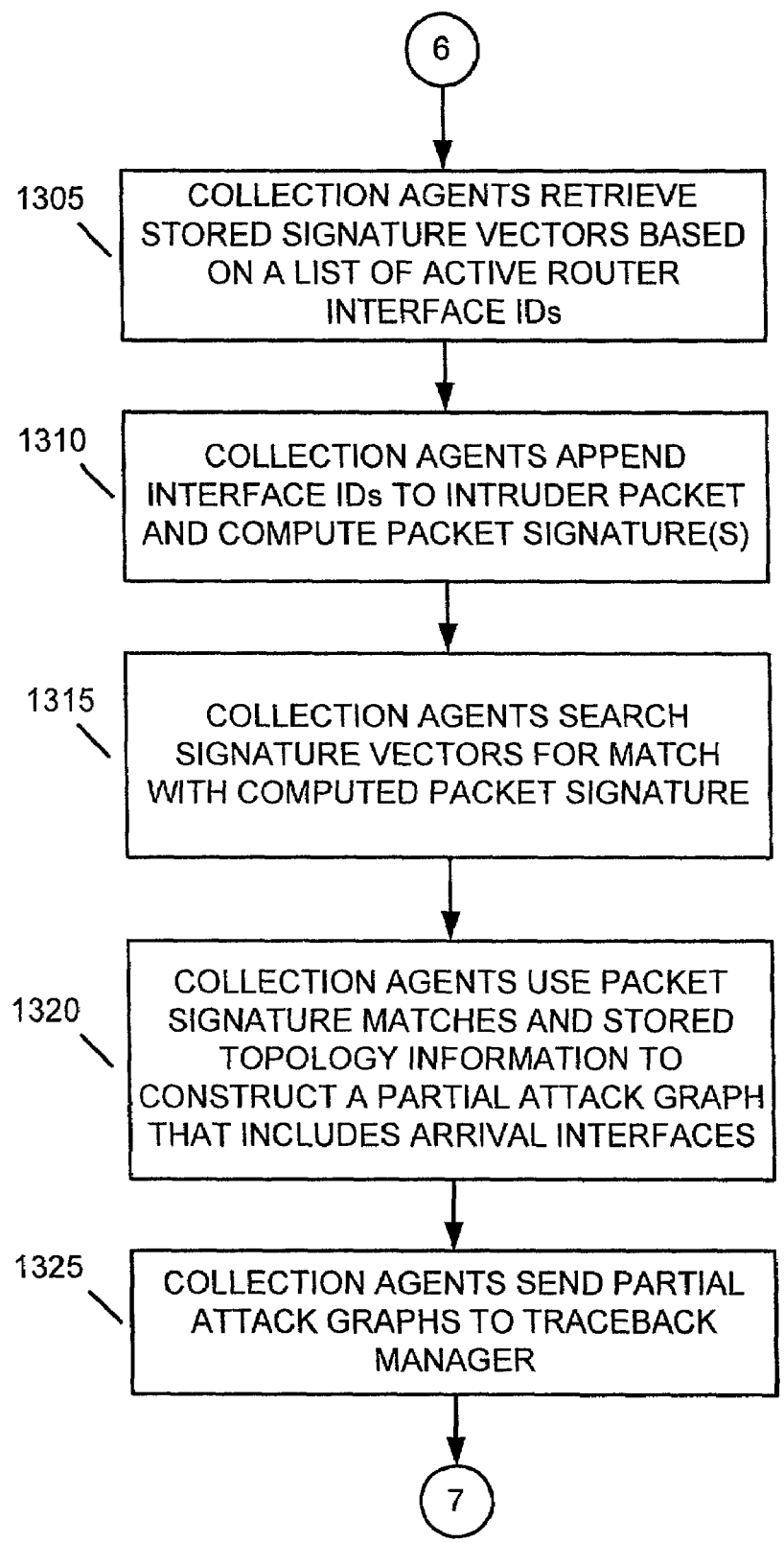
Figure 14:
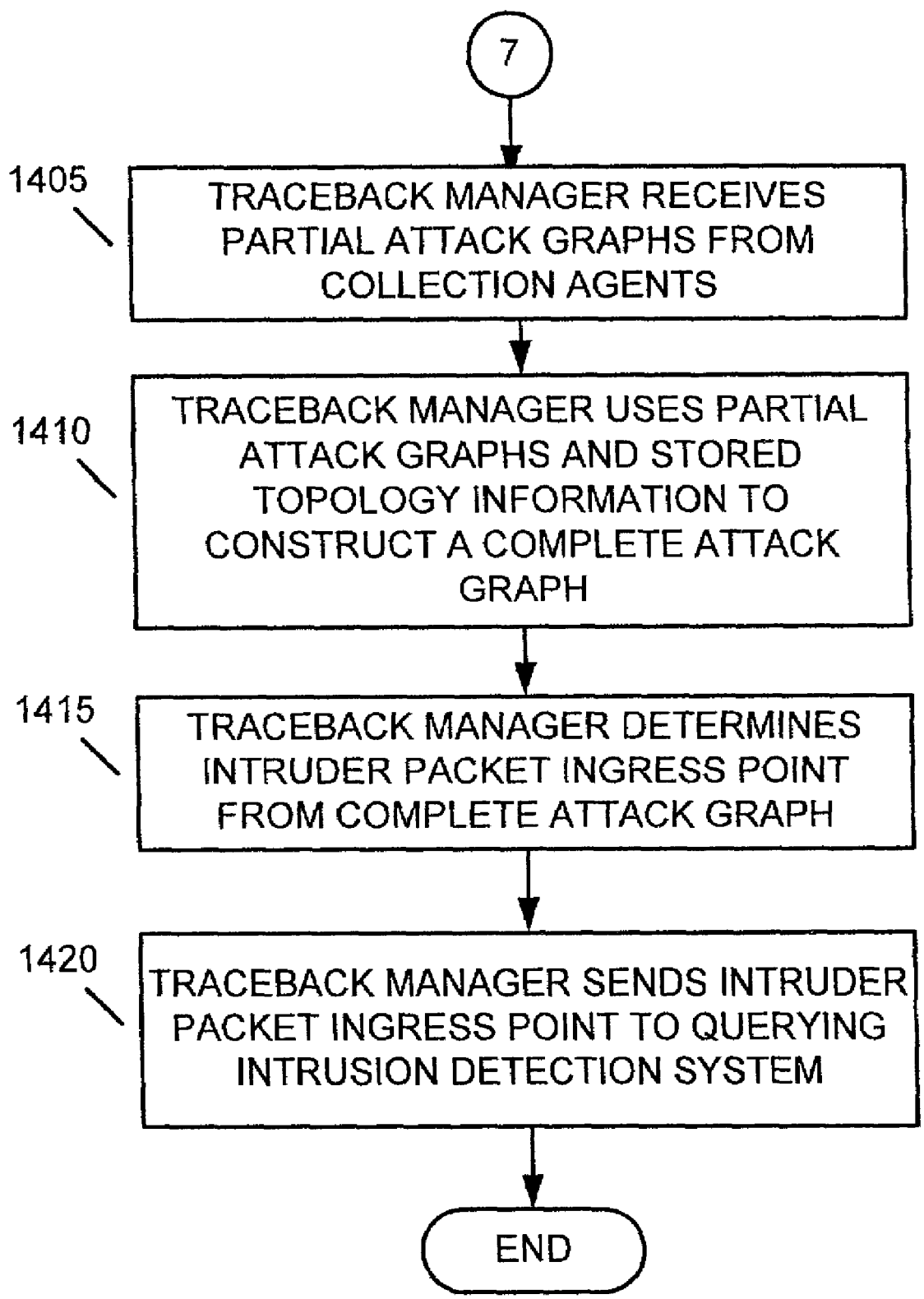

FIG. 10 illustrates processing, consistent with the present invention, for signature tap 610 computation of packet signatures at router 205 using an exemplary CRC-32 technique. To begin processing, signature tap 610 computes a CRC-32 of router 205's network address and Autonomous System (AS) number [step 1005]. The AS number may include a globally-unique number identifying a collection of routers operating under a single administrative entity. After receipt of a packet at input interface 505 or output interface 515, signature tap 610 may inspect the received packet and zero out the packet time-to-live (TTL), type-of-service (TOS), and packet checksum (e.g., error detection) fields [step 1010]. Signature tap 610 then may compute a CRC-32 packet signature of the entire received packet using the previously computed CRC-32's of router 205's network address and AS number [step 1015].

Exemplary Point of Ingress Traceback Processing

FIGS. 11–14 illustrate processing, consistent with the present invention, for tracing back an intruder packet to the packet's point of ingress into at least a portion of network 105. As one skilled in the art will appreciate, the method exemplified by FIGS. 11–14 can be implemented as sequences of instructions and stored in a memory 410 of traceback manager 110, collection agent 115 or intrusion detection system 120 (as appropriate) for execution by a processing unit 405.

To begin point of ingress traceback processing, intrusion detection system 120 may determine an occurrence of an intrusion event [step 1105]. In response to the determination, intrusion detection system 120 may capture an intruder packet associated with the intrusion event and send a query message to traceback manager 110 that includes the captured intruder packet [step 1110]. Traceback manager 110 may receive the query message from intrusion detection system 120 and verify the authenticity and/or integrity of the message using conventional authentication and error correction algorithms [step 1115]. Traceback manager 110 may request collection agents 115-1–115-N to poll their respective data generation agents 520 for stored signature vectors [step 1120]. Traceback manager 110 may send a message including the intruder packet to the collection agents 115-1–115-N [step 1125].

Collection agents 115-1–115-N may receive the message from traceback manage 110 that includes the intruder packet [step 1205]. Collection agents 115-1–115-N may generate a packet signature of the received intruder packet [step 1210] using the same hashing, MAC code, or Cyclical Redundancy Checking (CRC) algorithms used in the signature taps 610 of data generation agents 520. Collection agents 115-1–115-N may then query pertinent data generation agents to retrieve signature vectors, stored in respective ring buffers 625, that correspond to the intruder packet's expected transmit time range at each data generation agent [act 1215]. Collection agents 115-1–115-N may search the retrieved signature vectors for matches with the received intruder packet signature [step 1220]. If there are any matches, processing may continue with either steps 1225–1230 of FIG. 12 or steps 1305–1325 of FIG. 13.

At step 1225, collection agents 115a–115n use the packet signature matches and stored network topology information to construct a partial attack graph. For example, collection agents 115-1–115-N may implement conventional graph theory algorithms for constructing a partial attack graph. Such graph theory algorithms, for example, may construct a partial attack graph using the victim's network 125 as a root node and moving backwards to explore each potential path where the intruder packet has been. Each collection agent 115-1–115-N may store limited network topology information related only to the routers 205 to which each of the collection agents is connected. Collection agents 115-1–115-N may then send their respective partial attack graphs to traceback manager 110 [step 1230].

At step 1305, collection agents 115-1–115-N retrieve stored signature vectors based on a list of active router interface identifiers. Collection agents 115-1–115-N may append interface identifiers to the received intruder packet signature and compute a packet signature(s) [step 1310]. Collection agents 115-1–115-N may search the retrieved signature vectors for matches with the computed packet signature(s) [step 1315]. Collection agents 115-1–115-N may use the packet signature matches and stored topology information to construct a partial attack graph that includes the input interface at each router 205 through which the intruder packet arrived [step 1320]. Collection agents 115-1–115-N may each then send the constructed partial attack graph to traceback manager 110 [step 1325].

Traceback manager 110 may receive the partial attach graphs sent from collection agents 115-1–115-N [step 1405]. Traceback manager 110 may then use the received partial attack graphs and stored topology information to construct a complete attack graph [step 1410]. The complete attack graph may be constructed using conventional graph theory algorithms similar to those implemented in collection agents 115-1–115-N.

Using the complete attack graph, traceback manager 110 may determine the ingress point of the intruder packet into network 105 [step 1415]. Traceback manager 110 sends a message that includes the determined intruder packet ingress point to the querying intruder detection system 120 [step 1420].

CONCLUSION

Systems and methods consistent with the present invention, therefore, provide mechanisms that permit the archival of signatures of packets received at nodes throughout a network. Through comparison matching of the archived packet signatures with one or more signatures of an intruder packet detected by an intrusion detection system, systems and methods consistent with the present invention may isolate one or more attack paths of the intruder packet through the network based on a knowledge of the network topology.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Also, while series of steps have been described with regard to FIGS. 7–14, the order of the steps is not critical. The scope of the invention is defined by the following claims and their equivalents.

What is claimed is:

1. A method, comprising:
    receiving packets at the node;
    computing one or more signatures for each of the received packets;
    aggregating the computed one or more signatures in a first memory to produce one or more signature vectors, wherein the computed one or more signatures are aggregated over a collection interval R;
    archiving the one or more signature vectors in a second memory;
    providing the archived one or more signature vectors to an agent for determining a point of ingress for the packet when it entered a network; and
    randomly zeroing out a fraction of the one or more signature vectors that are older than P seconds.

2. The method of claim 1, wherein computing the one or more signatures for each of the received packets further comprises:
    computing one or more cyclical redundancy checking values for each of the received packets.

3. The method of claim 1, wherein computing the one or more signatures for each of the received packets further comprises:
    computing one or more hash values for each of the received packets.

4. The method of claim 1, wherein computing the one or more signatures for each of the received packets further comprises:
    computing one or more CRC-32 values for each of the received packets.

5. The method of claim 1, wherein the second memory comprises a ring buffer.

6. The method of claim 1, wherein archiving the one or more signature vectors comprises:
    storing the one or more signature vectors in the second memory indexed by the collection interval.

7. The method of claim 1, wherein archiving the one or more signature vectors comprises:
    storing a fraction of the one or more signature vectors in the second memory.

8. The method of claim 1, further comprising:
    discarding signature vectors of the archived one or more signature vectors that are older than P seconds.

9. The method of claim 1, further comprising:
    archiving the merged bits in the second memory for a period equaling a multiple of the collection interval R.

10. The method of claim 9, wherein the multiple of the collection interval R comprises 10*R.

11. The method of claim 1, wherein the second memory comprises a DRAM.

12. An apparatus for archiving signatures associated with packets received at a node in a network, comprising:
    a first memory;
    a second memory;
    a signature tap configured to:
        receive packets at the node;
        compute one or more signatures for each of the received packets;
    a multiplexer configured to:
        aggregate, over a collection interval R, the computed one or more signatures in the first memory to produce one or more signature vectors; and
    a controller configured to:
        archive the one or more signature vectors in the second memory; and
        randomly zero out a fraction of the one or more signature vectors that are older than P seconds.

13. The apparatus of claim 12, the one or more signature vectors comprising one or more cyclical redundancy checking values.

14. The apparatus of claim 12, the one or more signature vectors comprising one or more hash values.

15. The apparatus of claim 12, the one or more signature vectors comprising one or more CRC-32 values.

16. The apparatus of claim 12, wherein the second memory comprises a ring buffer.

17. The apparatus of claim 12, the controller further configured to:
    store the one or more signature vectors in the second memory indexed by the collection interval.

18. The apparatus of claim 12, the controller further configured to:
    store a fraction of the one or more signature vectors in the second memory.

19. The apparatus of claim 12, the controller further configured to:
    discard signature vectors of the archived one or more signature vectors that are older than P seconds.

20. The apparatus of claim 12, the controller further configured to:
    archive the merged bits in the second memory for a period equaling a multiple of the collection interval R.

21. The apparatus of claim 20, wherein the multiple of the collection interval R comprises 10*R.

22. The apparatus of claim 12, wherein the second memory comprises a DRAM.

23. A system, comprising:
a first memory;
a second memory;
one or more signature taps configured to:
  receive packets at the node, and
  compute one or more signatures for each of the received packets;
a multiplexer configured to:
use each of the one or more signatures as addresses for addressing bit locations in the first memory,
set memory bits in the addresses of the first memory corresponding to each of the one or more signatures; and
a controller configured to archive a signature vector comprising a block of memory bits from the first memory in the second memory.

24. A system, comprising:
a first memory;
a second memory;
a signature tap to determine at least one signature for each packet of a plurality of received packets;
a multiplexer to store, over a collection interval, the determined at least one signature for each of the plurality of received packets in the first memory to produce a signature vector that comprises a block of a plurality of signatures for at least a portion of the plurality of received packets; and
a controller configured to archive the signature vector in the second memory after an expiration of the collection interval.

25. The system of claim 24, the at least one signature comprising a cyclical redundancy checking value.

26. The system of claim 24, the at least one signature comprising a hash value.

27. The system of claim 24, the at least one signature comprising a CRC-32 value.

28. The system of claim 24, wherein the second memory comprises a ring buffer.

29. The system of claim 24, the controller further configured to:
archive the one or more signature vectors in the second memory indexed by the collection interval.

30. The system of claim 24, the controller further configured to:
archive a fraction of the one or more signature vectors in the second memory.

31. The system of claim 24, the controller further configured to:
discard signature vectors of the archived one or more signature vectors that are older than P seconds.

32. The system of claim 24, wherein the second memory comprises a DRAM.

* * * * *